US00RE45299E

(19) United States
(12) Reissued Patent
Papasakellariou et al.

(10) Patent Number: US RE45,299 E
(45) Date of Reissued Patent: Dec. 23, 2014

(54) RECEIVING A PILOT DESIGN AND CHANNEL ESTIMATION

(71) Applicant: Texas Instruments Incorporated, Dallas, TX (US)

(72) Inventors: Aris Papasakellariou, Houston, TX (US); Timothy M. Schmidl, Dallas, TX (US); Eko N Onggosanusi, Allen, TX (US); Anand Dabak, Plano, TX (US)

(73) Assignee: Texas Instruments Incorporated, Dallas, TX (US)

(21) Appl. No.: 13/867,015

(22) Filed: Apr. 19, 2013

Related U.S. Patent Documents

Reissue of:
(64) Patent No.: 7,929,416
Issued: Apr. 19, 2011
Appl. No.: 12/639,422
Filed: Dec. 16, 2009

U.S. Applications:
(62) Division of application No. 11/424,939, filed on Jun. 19, 2006, now Pat. No. 7,660,229.

(60) Provisional application No. 60/692,184, filed on Jun. 20, 2005, provisional application No. 60/709,085, filed on Aug. 16, 2005, provisional application No. 60/723,891, filed on Oct. 5, 2005.

(51) Int. Cl.
*H04J 11/00* (2006.01)

(52) U.S. Cl.
USPC ..... 370/208; 370/334; 370/343; 370/345; 375/260; 375/316

(58) Field of Classification Search
None
See application file for complete search history.

(56) References Cited

U.S. PATENT DOCUMENTS

| | | | | |
|---|---|---|---|---|
| 5,867,478 | A | 2/1999 | Baum et al. | |
| 6,359,938 | B1 | 3/2002 | Keevill et al. | |
| 6,473,467 | B1 | 10/2002 | Wallace et al. | |
| 6,985,498 | B2 | 1/2006 | Laroia et al. | |
| 6,999,467 | B2 | 2/2006 | Krauss et al. | |
| 7,027,429 | B2 * | 4/2006 | Laroia et al. | 370/350 |
| 7,551,691 | B2 * | 6/2009 | De Bart et al. | 375/326 |
| 7,660,229 | B2 | 2/2010 | Papasakellariou et al. | |
| 7,929,416 | B2 | 4/2011 | Papasakellariou et al. | |

(Continued)

OTHER PUBLICATIONS

Thierry Lestable et al., Adaptive Pilot Pattern for Multi-Carrier Spread-Spectrum (MC-SS) Transmission Systems; 2004 IEEE; pp. 385-388.

(Continued)

*Primary Examiner* — Chi Pham
*Assistant Examiner* — Shick Hom
(74) *Attorney, Agent, or Firm* — David Denker; Frederick J. Telecky, Jr.

(57) ABSTRACT

A receiver in an OFDM based communication system is adapted to perform channel estimation using a received reference signal transmitted from at least one antenna The reference signal is substantially located into at least two OFDM symbols of a transmission time interval comprising of more than two OFDM symbols. A power level of said reference signal is divided into said non-consecutive OFDM symbols in said transmission time interval and adapted to use the reference signal located in a first OFDM symbol in succeeding transmission time intervals in addition to the reference symbols in a current transmission time interval and a preceding transmission time interval.

18 Claims, 5 Drawing Sheets

(56) References Cited

U.S. PATENT DOCUMENTS

| | | | | |
|---|---|---|---|---|
| 8,462,611 | B2 * | 6/2013 | Ma et al. | 370/208 |
| 2002/0122383 | A1 | 9/2002 | Wu et al. | |
| 2003/0072254 | A1 | 4/2003 | Ma et al. | |
| 2003/0227866 | A1 | 12/2003 | Yamaguchi | |
| 2004/0086055 | A1 | 5/2004 | Li | |
| 2004/0091057 | A1 | 5/2004 | Yoshida | |
| 2005/0254592 | A1 * | 11/2005 | Naguib et al. | 375/267 |
| 2006/0256761 | A1 * | 11/2006 | Meylan et al. | 370/338 |
| 2007/0070944 | A1 | 3/2007 | Rinne et al. | |
| 2008/0151989 | A1 * | 6/2008 | Von Elbwart et al. | 375/239 |
| 2009/0003466 | A1 | 1/2009 | Taherzadehboroujeni et al. | |

OTHER PUBLICATIONS

Downlink Multiple Access Parameterisation; R1-050384-3GPP TSG RAN WG1#41, Athens, Greece; May 9-13, 2005.

EUTRA Downlink Numerology; R1-050520-3GPP TSG RAN1#41 Meeting, Athens, Greece, May Sep. 13, 2005.

Performance and Implementation Aspects for Scattered and TDM Pilot Formats in EUTRA OFDMA Downlink; R1-051060-3GPP TSG RAN WG1, San Diego, California, USA; Oct. 10-14, 2005.

TP on Pilot Structure for OFDM based E-UTRA Downlink Unicast; R1-051489-3GPP TSG-RAN WG1 #43, Seoul, Korea; Nov. 7-11, 2005.

On Pilot Structure for IFDM Based E-UTRA Downlink Multicast; R1-051490-3GPP TSG-RAN WG1 #43; Seoul, Korea; Nov. 7-11, 2005.

Boosting the Uplink Pilot Transmission Power for Higher Mobility UEs; R1-060924-3GPP TSG-RAN WG1 Meeting #44bis; Athens, Greece; Mar. 27-31, 2006.

PCT/US 06/23901 International Search Report, Dec. 14, 2006.

* cited by examiner

RECEIVING A PILOT DESIGN AND CHANNEL ESTIMATION

Matter enclosed in heavy brackets [ ] appears in the original patent but forms no part of this reissue specification; matter printed in italics indicates the additions made by reissue.

CROSS REFERENCE TO RELATED APPLICATIONS

This application is a Divisional of U.S. application Ser. No. 11/424,939 filed on Jun. 19, 2006, *now issued as U.S. Pat. No. 7,660,229,* which claims priority to U.S. Provisional Application No. 60/692,184 entitled "Pilot design and channel estimation for OFDM" filed Jun. 20, 2005, U.S. Provisional Application No. 60/709,085 entitled "Pilot design and channel estimation for OFDM" filed Aug. 16, 2005, and U.S. Provisional Application No. 60/723,891 entitled "Pilot design and channel estimation for OFDM" filed Oct. 5, 2005. All applications assigned to the assignee hereof and hereby incorporated by reference.

BACKGROUND

Embodiments of the invention are directed, in general, to communication systems and, more specifically, to pilot design used in communications systems.

The global market for both voice and data communication services continues to grow as does users of the systems which deliver those services. As communication systems evolve, system design has become increasingly demanding in relation to equipment and performance requirements. Future generations of communication systems, will be required to provide high quality high transmission rate data services in addition to high quality voice services. Orthogonal Frequency Division Multiplexing (OFDM) is a technique that will allow for high speed voice and data communication services.

Orthogonal Frequency Division Multiplexing (OFDM) is based on the well-known technique of Frequency Division Multiplexing (FDM). OFDM technique relies on the orthogonality properties of the fast Fourier transform (FFT) and the inverse fast Fourier transform (IFFT) to eliminate interference between carriers. At the transmitter, the precise setting of the carrier frequencies is performed by the IFFT. The data is encoded into constellation points by multiple (one for each carrier) constellation encoders. The complex values of the constellation encoder outputs are the inputs to the IFFT. For wireless transmission, the outputs of the IFFT are converted to an analog waveform, up-converted to a radio frequency, amplified, and transmitted. At the receiver, the reverse process is performed. The received signal (input signal) is amplified, down converted to a band suitable for analog to digital conversion, digitized, and processed by a FFT to recover the carriers. The multiple carriers are then demodulated in multiple constellation decoders (one for each carrier), recovering the original data. Since an IFFT is used to combine the carriers at the transmitter and a corresponding FFT is used to separate the carriers at the receiver, the process has potentially zero inter-carrier interference.

FIG. 1 is a diagram illustrative of the Frequency 103—Time 101 Representation 100 of an OFDM Signal. In FDM different streams of information are mapped onto separate parallel frequency channels 140. Each FDM channel is separated from the others by a frequency guard band to reduce interference between adjacent channels.

The OFDM technique differs from traditional FDM in the following interrelated ways:

1. multiple carriers (called sub-carriers 150) carry the information stream;
2. the sub-carriers 150 are orthogonal to each other; and
3. a Cyclic Prefix (CP) 110 (also known as guard interval) is added to each symbol 120 to combat the channel delay spread and avoid OFDM inter-symbol interference (ISI).

The data/information carried by each sub-carrier 150 may be user data of many forms, including text, voice, video, and the like. In addition, the data includes control data, a particular type of which is discussed below. As a result of the orthogonality, ideally each receiving element tuned to a given sub-carrier does not perceive any of the signals communicated at any other of the sub-carriers. Given this aspect, various benefits arise. For example, OFDM is able to use orthogonal sub-carriers and, as a result, thorough use is made of the overall OFDM spectrum. As another example, in many wireless systems, the same transmitted signal arrives at the receiver at different times having traveled different lengths due to reflections in the channel between the transmitter and receiver. Each different arrival of the same originally-transmitted signal is typically referred to as a multi-path. Typically, multi-paths interfere with one another, which is sometimes referred to as InterSymbol Interference (ISI) because each path includes transmitted data referred to as symbols. Nonetheless, the orthogonality implemented by OFDM considerably reduces ISI and, as a result, often a less complex receiver structure, such as one without an equalizer, may be implemented in an OFDM system.

A Cyclic Prefix (CP) (also known as guard interval) is added to each symbol to combat the channel delay spread and avoid OFDM inter-symbol interference (ISI). FIG. 2 is a diagram illustrative of using Cyclic Prefix (CP) to eliminate ISI and perform frequency domain equalization. Blocks 200 each comprising cyclic prefix 210 coupled to data symbols 220 to perform frequency domain equalization. OFDM typically allows the application of simple, 1-tap, frequency domain equalization (FDE) through the use of a Cyclic Prefix (CP) 210 at every FFT processing block 200 to suppress multi-path interference. Two blocks are shown for drawing convenience. CP 210 eliminates inter-data-block interference and multi-access interference using Frequency Division Multiple Access (FDMA).

Since orthogonality is guaranteed between overlapping sub-carriers and between consecutive OFDM symbols in the presence of time/frequency dispersive channels, the data symbol density in the time-frequency plane can be maximized and high data rates can be very efficiently achieved for high Signal-to-Interference and Noise Ratios (SINR).

FIG. 3 is a diagram illustrative of Cyclic Prefix (CP) Insertion. A number of samples is typically inserted between useful OFDM symbols 320 (guard interval) to combat OFDM ISI induced by channel dispersion, assist receiver synchronization, and aid spectral shaping. The guard interval 310 is typically a prefix that is inserted 350 at the beginning of the useful OFDM symbol (OFDM symbol without the CP) 320. The CP duration 315 should be sufficient to cover most of the delay-spread energy of a radio channel impulse response. It should also be as small as possible since it represents overhead and reduces OFDM efficiency. Prefix 310 is generated using a last block of samples 340 from the useful OFDM symbol 330 and is therefore a cyclic extension to the OFDM symbol (cyclic prefix).

When the channel delay spread exceeds the CP duration 315, the energy contained in the ISI should be much smaller than the useful OFDM symbol energy and therefore, the OFDM symbol duration 325 should be much larger than the channel delay spread. However, the OFDM symbol duration 325 should be smaller than the minimum channel coherence time in order to maintain the OFDM ability to combat fast temporal fading. Otherwise, the channel may not always be constant over the OFDM symbol and this may result in inter-sub-carrier orthogonality loss in fast fading channels. Since the channel coherence time is inversely proportional to the maximum Doppler shift (time-frequency duality), this implies that the symbol duration should be much smaller than the inverse of the maximum Doppler shift.

The large number of OFDM sub-carriers makes the bandwidth of individual sub-carriers small relative to the total signal bandwidth. With an adequate number of sub-carriers, the inter-carrier spacing is much narrower than the channel coherence bandwidth. Since the channel coherence bandwidth is inversely proportional to the channel delay spread, the sub-carrier separation is generally designed to be much smaller that the inverse of the channel coherence time. Then, the fading on each sub-carrier appears flat in frequency and this enables 1-tap frequency equalization, use of high order modulation, and effective utilization of multiple transmitter and receiver antenna techniques such as Multiple Input/Multiple Output (MIMO). Therefore, OFDM effectively converts a frequency-selective channel into a parallel collection of frequency flat sub-channels and enables a very simple receiver. Moreover, in order to combat Doppler effects, the inter-carrier spacing should be much larger than the maximum Doppler shift.

The baseband representation 400 of the OFDM signal generation using an N-point IFFT 460 is shown in FIG. 4, where n refers to the $n^{th}$ sub-channel modulated data symbol 420, during the time 401 period $0<t\leq T_u$ where Tu is OFDM useful symbol duration. The vector S is defined as the useful OFDM symbol and is practically the time superposition of the N narrowband modulated sub-carriers. Therefore, from a parallel stream of N data sources, a waveform composed of N orthogonal sub-carriers 407 is obtained. At the receiver, a computationally efficient Fast Fourier Transform (FFT) may be used to demodulate the multi-carrier information and to recover the transmitted data.

FIG. 5 shows the concepts of frequency diversity 500 and multi-user diversity 505. Using link adaptation techniques based on the estimated dynamic channel properties, the OFDM transmitter can adapt the transmitted signal to each User Equipment (UE) to match channel conditions and approach the ideal capacity of frequency-selective channel. Thanks to such properties as flattened channel per sub-carrier, high-order modulation, orthogonal sub-carriers, and MIMO; it is possible to improve spectrum utilization and increase achievable peak data rate in OFDM system. Also, OFDM can provide scalability for various channel bandwidths (i.e. 1.25, 2.5, 5, 10, 20 MHz) without significantly increasing complexity.

OFDM may be combined with Frequency Division Multiple Access (FDMA) in an Orthogonal Frequency Division Multiple Access (OFDMA) system to allow multiplexing of multiple UEs over the available bandwidth. Because OFDMA assigns UEs to isolated frequency sub-carriers, intra-cell interference may be avoided and high data rate may be achieved. The base station (or Node B) scheduler assigns physical channels based on Channel Quality Indication (CQI) feedback information from the UEs, thus effectively controlling the multiple-access mechanism in the cell. For example, in FIG. 5, transmission to each of the three UEs 501, 502, 503 is scheduled at frequency sub-bands where the channel frequency response allows for higher SINR relative to other sub-bands. This is represented by the Received signal levels R501, R502, and R503 for users 501, 502 and 503 at Frequencies F501, F502, and F503 respectively.

OFDM can use frequency-dependent scheduling with optimal per sub-band Modulation & Coding Scheme (MCS) selection. For each UE and each Transmission Time Interval (TTI), the Node B scheduler selects for transmission with the appropriate MCS a group of the active UEs in the cell, according to some criteria that typically incorporate the achievable SINR based on the CQI feedback. In addition, sub-carriers or group of sub-carriers may be reserved to transmit pilot, signaling or other channels. Multiplexing may also be performed in the time dimension, as long as it occurs at the OFDM symbol rate or at a multiple of the symbol rate (i.e. from one IFFT computation to the next). The MCS used for each sub-carrier or group of sub-carriers can also be changed at the corresponding rate, keeping the computational simplicity of the FFT-based implementation. This allows 2-dimensional time-frequency multiplexing, as shown in FIG. 6 and FIG. 7.

Transmission Time Interval (TTI) may also be referred to as a frame.

Turning now to FIG. 6, which is a diagram illustrative of a configuration for multi-user diversity. The minimum frequency sub-band used for frequency-dependent scheduling of a UE typically comprises of several sub-carriers and may be referred to as a Resource Block (RB) 620. Reference number 620 is only pointing to one of the 8 RBs per OFDM symbol shown as example and for drawing clarity. RB 620 is shown with RB bandwidth 625 in frequency dimension and TTI duration 610 in time dimension. Each RB may be comprised of continuous sub-carriers and thus be localized in nature to afford frequency-dependent scheduling. A high data rate UE may use several RBs within same TTI 630. UE #1 is shown as an example of a high rate UE. Low data rate UEs may be multiplexed within the same RB 640.

Alternatively referring to FIG. 7, which is a diagram illustrative of a configuration for frequency diversity, an RB 720 may correspond to a number of sub-carriers substantially occupying the entire bandwidth thereby offering frequency diversity. This may be useful in situations where CQI feedback is not available or it is unreliable (as is the case for high speed UEs).

To facilitate data-aided methods, OFDM systems periodically insert reference (or pilot) symbols that are known a priori, into the transmission signal. The receiver can thus estimate the channel response based on the received pilot symbols and the known transmitted pilot symbols. In an OFDM based communication system, pilot symbols are transmitted in addition to data symbols in order to serve, inter aila, in providing a reference for the receiver to estimate the channel medium and accordingly demodulate the received signal. A pilot signal also referred to as reference signal is composed of the pilot symbols.

The DownLink (DL) pilot signal should provide effective performance for the following functions:

Channel estimation at all possible operating carrier frequencies for all physical channels for all channel multipath delay spreads (frequency selectivity) encountered in practice and for all UE speeds of interest.

CQI measurement for link adaptation and channel-dependent scheduling.

Sector identification of sector within the same cell.

Measurements for cell search and handover.

UE dedicated pilot signals may also be used for UE-dependent adaptive beam-forming. Moreover, as the pilot signal is actually overhead consuming resources that could have been otherwise dedicated for data transmission, it should have minimum time/frequency and power overhead.

Two types of pilot structure have been previously examined;

i) a Time-Division Multiplexed (TDM) pilot structure where the pilot signal is placed on a single OFDM symbol per TTI (FIG. 8).

ii) a scattered pilot structure where the pilot signal is placed in every OFDM symbol per TTI (FIG. 9)

In the example shown in FIG. 8, the TTI is assumed to comprise of seven OFDM symbols 810. Moreover, the TTI duration is assumed to be 0.5 milliseconds. Shaded dots indicate pilot locations for 1 transmit antenna. In the example of FIG. 9, the TTI is assumed to comprise of seven OFDM symbols 910. Shaded dots indicate pilot locations for 1 transmit antenna. Channel estimation is based on time and frequency interpolation among pilot sub-carriers in order to obtain the channel estimates at the position corresponding to data sub-carriers. In order to be able to perform frequency interpolation, the pilot sub-carrier spacing in the frequency domain should be smaller than the 50% correlation coherence bandwidth of the channel for all channels of interest. Similarly, in order to be able to perform time interpolation, the pilot sub-carrier spacing in the time domain should be smaller than the 50% coherence time of the channel at the operating carrier frequency for all UE speeds of interest. The example shown in FIG. 8 has a spacing in frequency domain $\Delta F_{pil}$ 830 of 4 sub-carriers and spacing in time domain $\Delta T_{pil}$ 820 of 7 OFDM symbols. The example shown in FIG. 9 has a spacing in frequency domain $\Delta F_{pil}$ 930 of 4 sub-carriers and spacing in time domain $\Delta T_{pil}$ 920 of 1 OFDM symbol.

Additional requirements for the pilot signal design may relate to the ability to demodulate only an initial sub-set of the TTI without having to receive the entire TTI. This is applicable, for example, when the control channel associated with scheduling of UEs in the current TTI at various RBs is transmitted in the first few OFDM symbols in every TTI. Then, it may be beneficial to demodulate and decode the control channel prior to the reception of the remaining OFDM symbols in the referenced TTI in order to reduce latency. Moreover, in order to improve channel estimation performance, it is desirable to capture as much of the transmitted pilot signal power as possible without additional latency. Clearly, the pilot signal power from preceding TTIs may be assumed available to the UE but the UE will have to incur additional decoding latency if it were to obtain the pilot signal power from succeeding TTIs. However, this would be particularly desirable for channel estimation performance as it would result to pilot signal availability that is more symmetric relative to the TTI of interest.

Based on the above discussion, the following disadvantages can be directly identified for the pilot structures of prior art:

1) The TDM pilot structure cannot provide reliable channel estimation and communication support at high UE speeds. For example, for a UE speed of 250 Kmph and carrier frequency of 2.6 GHz, the channel at the fourth OFDM symbol in the TTI structure of FIG. 8 has very little correlation with the channel at the first OFDM symbol of the same TTI or the channel at the first OFDM symbol of the next TTI where the pilot sub-carriers are located. The same problem would persist if the pilot sub-carriers were placed at another OFDM symbol in the TTI (not the first symbol).

2) The nature of the scattered pilot structure results to very little pilot signal power concentration per OFDM symbol. As a result, if the control channel is transmitted in the first few OFDM symbols in the TTI, there may not be enough pilot signal power to demodulate is prior to the reception of the entire TTI. Moreover, if any substantial pilot signal power from the succeeding TTI is to be obtained in order to provide some symmetry in the channel estimated for the TTI of interest, substantial latency will be incurred as the pilot sub-carriers in several OFDM symbols of the succeeding TTI will need to be captured.

There is a need for an improved pilot structure design in order to achieve accurate channel estimates for high user equipment (UE) speeds in mobile operations while also achieve the ability to use substantial pilot energy from succeeding TTI with minimum latency.

SUMMARY

In light of the foregoing background, embodiments of the invention provide a method for generating a structure in an orthogonal frequency division multiplexing communication system having a transmitter with a least one transmitting antenna, said method comprising; composing a frame with a time domain and a frequency domain, wherein the frame has a transmission time interval in the time domain with a beginning and an ending; and locating a pilot, having pilot power level, from a first at least one antenna into two orthogonal frequency division multiplexing symbols of said frame.

Therefore, the system and method of embodiments of the present invention solve the problems identified by prior techniques and provide additional advantages.

BRIEF DESCRIPTION OF THE DRAWINGS

Figure 1:
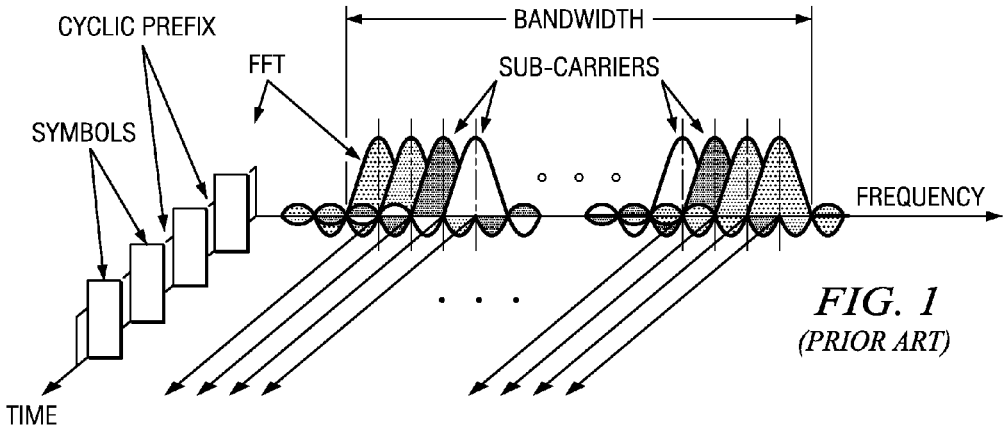
FIG. 1 (PRIOR ART)
Figure 2:
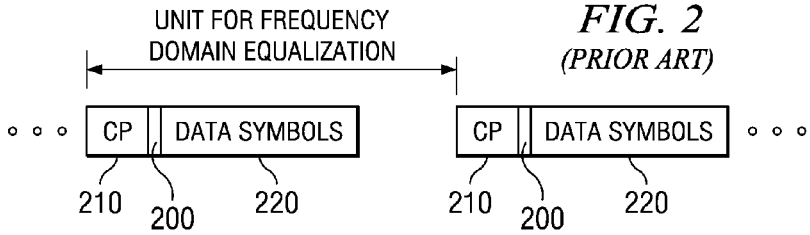
FIG. 2 (PRIOR ART)
Figure 3:
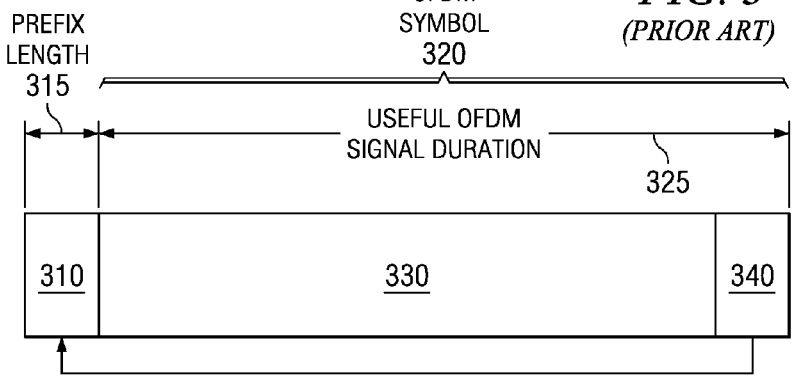
FIG. 3 (PRIOR ART)

Having thus described the invention in general terms, reference will now be made to the accompanying drawings, which are not necessarily drawn to scale, and wherein:

FIG. 1 is a diagram illustrative of the Frequency-Time Representation of an OFDM Signal;

FIG. 2 is a diagram illustrative of using cyclic prefix (CP) to eliminate ISI and perform frequency domain equalization;

FIG. 3 is a diagram illustrative of Cyclic Prefix (CP) Insertion

Figure 4:
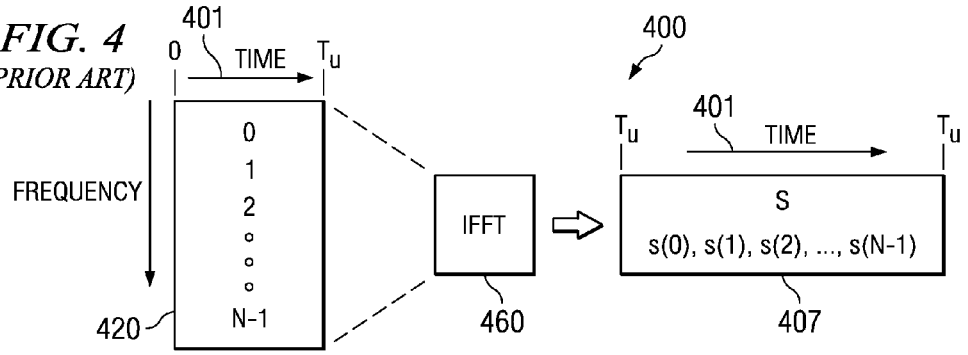
FIG. 4 (PRIOR ART)
Figure 5:
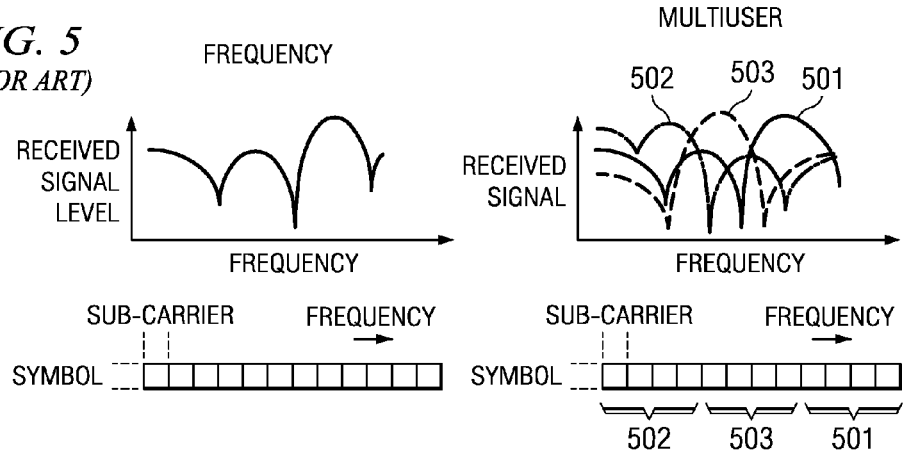
FIG. 5 (PRIOR ART)
Figure 6:
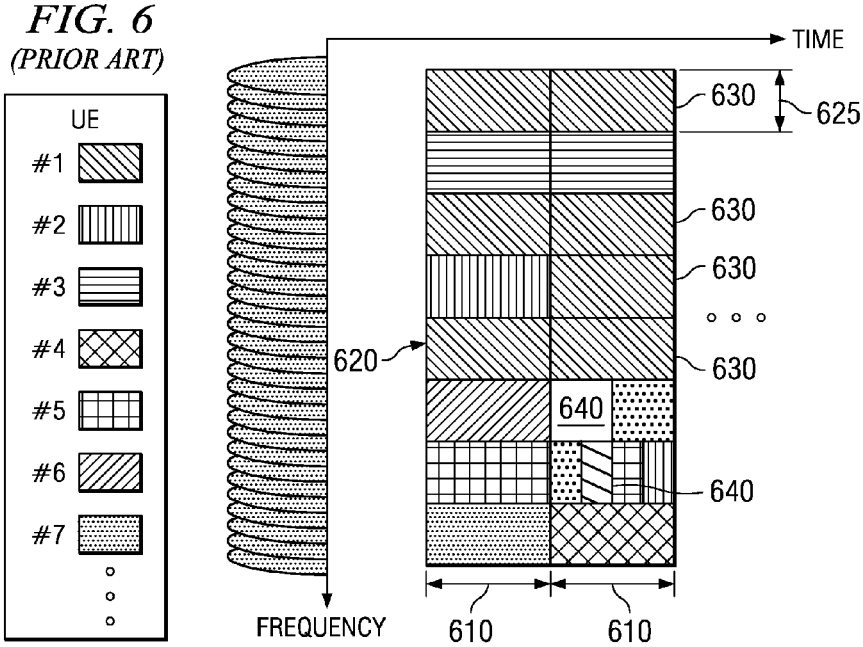
FIG. 6 (PRIOR ART)
Figure 7:
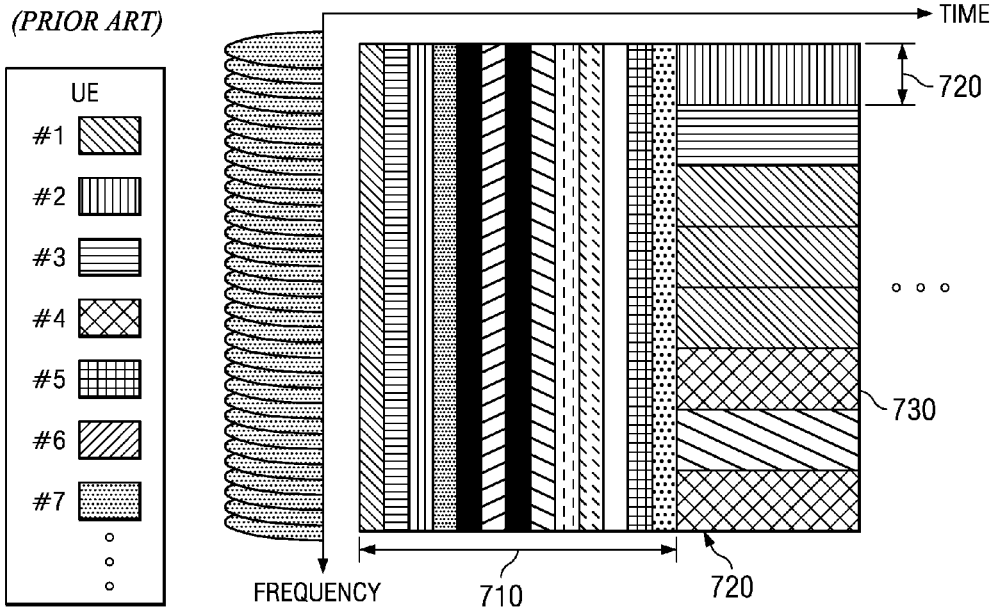
FIG. 7 (PRIOR ART)
Figure 8:
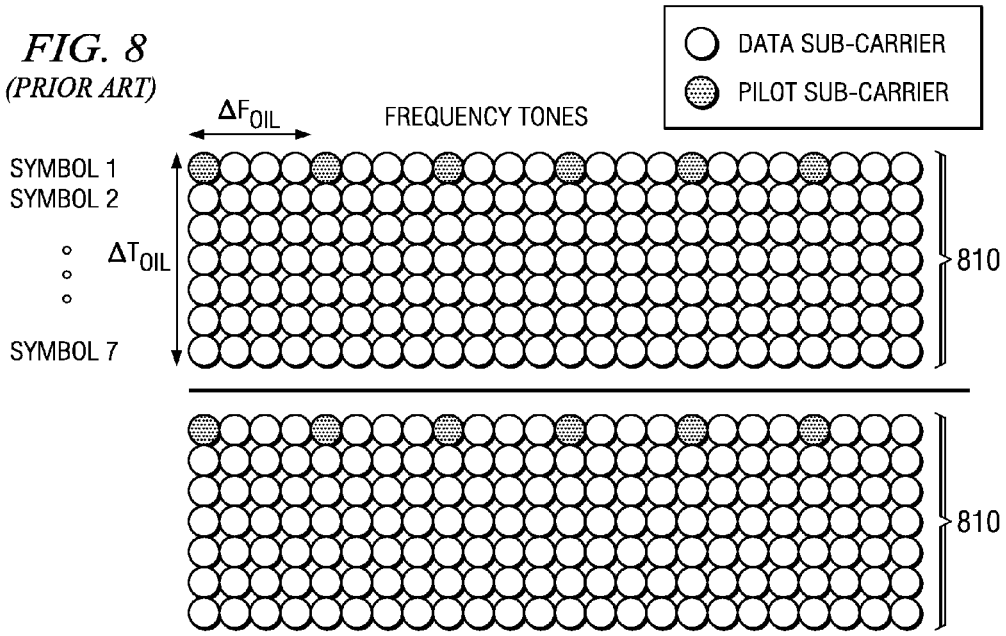
FIG. 8 (PRIOR ART)
Figure 9:
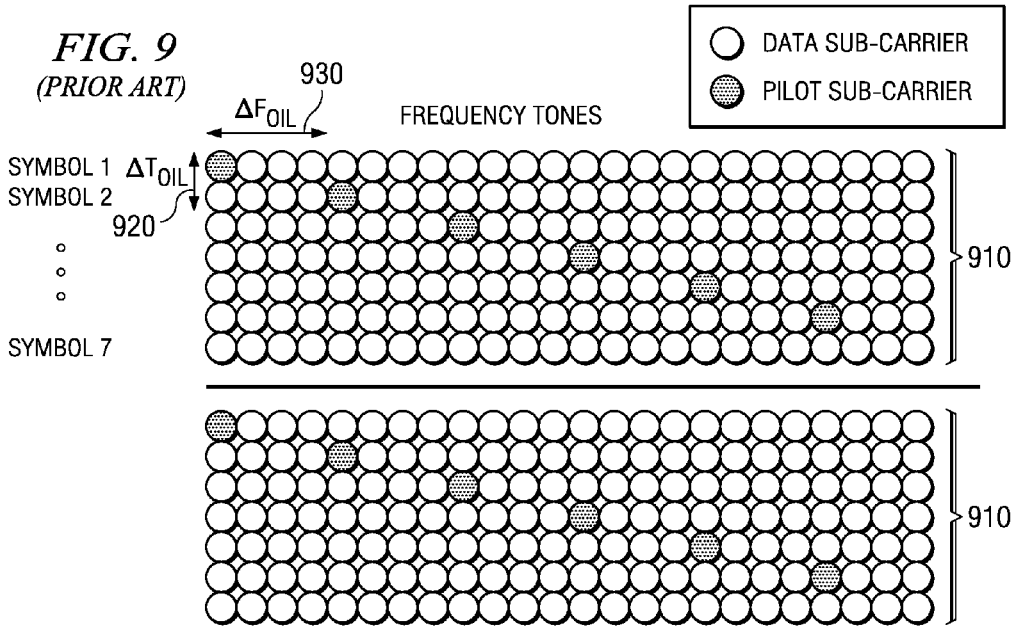
FIG. 9 (PRIOR ART)
Figure 10:
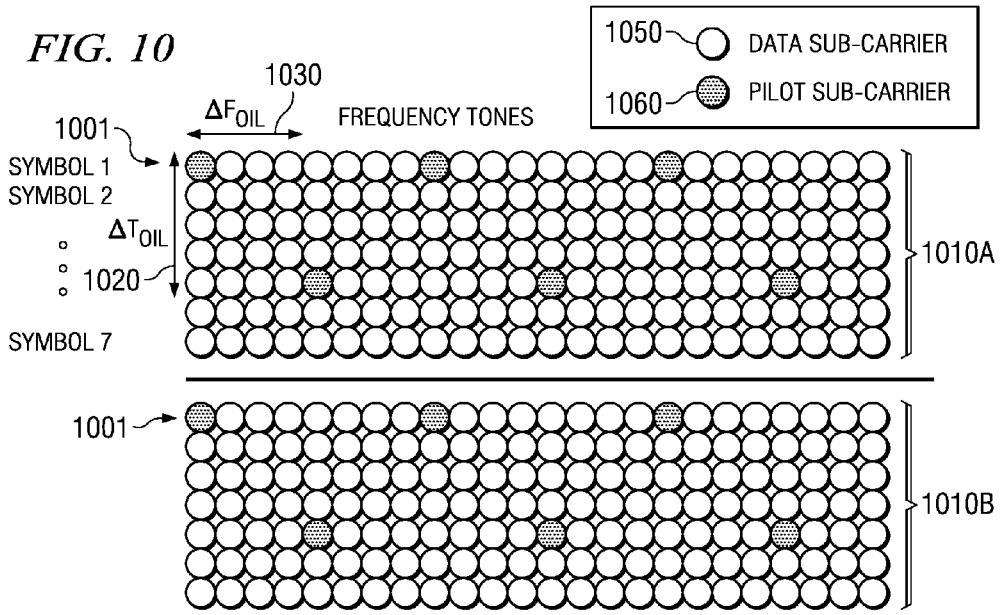
Figure 11:
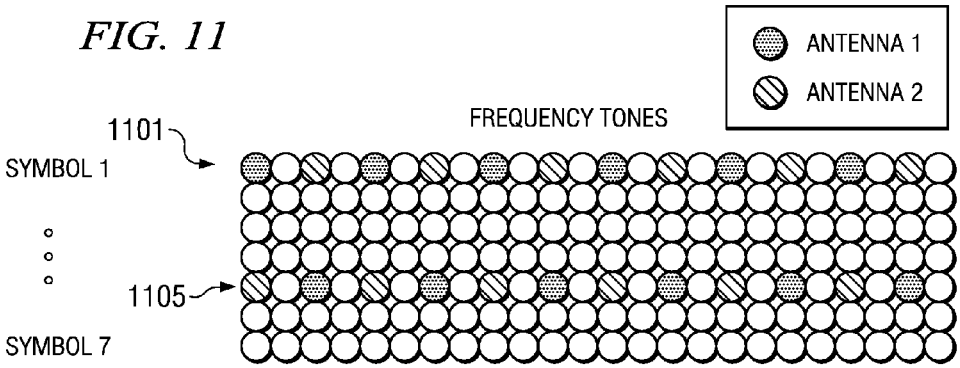
Figure 12:
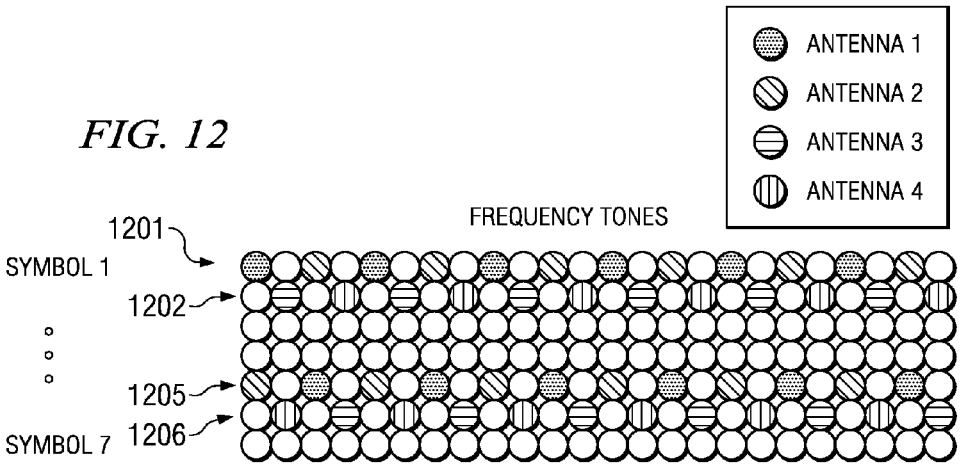

FIG. 4 shows OFDM Useful Symbol Generation Using an inverse fast Fourier transform (IFFT);

FIG. 5 shows the concepts of frequency and multi-user diversity;

FIG. 6 is a diagram illustrative of a configuration for Multi-User Diversity;

FIG. 7, which is a diagram illustrative of a configuration for frequency diversity;

FIG. 8 shows an exemplary Time-Division Multiplexed (TDM) pilot structure;

FIG. 9 shows an exemplary scattered pilot structure;

FIG. 10 shows a staggered pilot structure in accordance with embodiments of the invention using one transmit antenna;

FIG. 11 shows a staggered pilot structure in accordance with embodiments of the invention using two transmit antennas; and FIG. 12 shows a staggered pilot structure in accordance with embodiments of the invention using four transmit antennas.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In this disclosure, the term pilot parameters can mean pilot power, number of pilot fields, pilot position, power of each pilot field, etc. The term speed and velocity may be used interchangeably. One skilled in the art may be able to use the various embodiments of the invention to use both the speed and direction of a mobile to adjust other parameters to vary the power and direction of signal transmission.

A novel pilot structure circumventing the aforementioned shortcomings is presented in embodiments of this invention. FIG. 10 shows a staggered pilot structure for the exemplary case of one transmit antenna, but several obvious extensions are discussed for more transmit antennas. Staggered pilot structure 1000 comprises a TTI of seven OFDM symbols 1010. Shaded dots 1060 indicate pilot locations for 1 transmit antenna. Non-shaded dots 1050 indicate data sub-carrier. The exemplary embodiment shown in FIG. 1000 has a spacing in frequency domain $\Delta F_{pil}$ 1030 of 4 sub-carriers and spacing in time domain $\Delta T_{pil}$ 1020 of 4 OFDM symbols.

The attributes of the staggered pilot signal structures disclosed in the embodiments can be summarized as follows:

i) The pilot signal power is divided in the beginning and middle of the TTI. In the exemplary embodiment, 50% of the pilot signal power from the transmit antenna is placed at the first OFDM symbol 1001 and the remaining 50% is placed at the fifth OFDM symbol 1005 of the seven OFDM symbol exemplary TTI 1010. Placing the pilot signal power at the second and the sixth OFDM symbols instead of the first and fifth OFDM symbols is an alternative of dividing the pilot signal power between the beginning and middle of the TTI. Asymmetric power allocation may also be possible.

ii) For the exemplary TTI structure 1010 having 0.5 milliseconds duration, the staggered pilot signal structure can maintain good channel estimation quality even for very high speeds of interest as channel estimates can be always obtained well before the 50% coherence time period of the channel.

iii) The pilot sub-carrier spacing in the frequency domain can be easily designed to be smaller that the 50% correlation coherence bandwidth for the longest channel among the channels of interest.

iv) Sufficient pilot signal energy exists in the first OFDM symbol 1001 of the TTI of interest 1010A and the preceding TTI 10108 to decode a control channel that may be located in the first few OFDM symbols with minimal performance degradation and without additional latency from the absence of the pilot sub-carriers at the fifth OFDM symbol of the TTI.

v) Sufficient pilot signal energy exists in the first OFDM symbol 1001 of the succeeding TTI 10108 to materially improve channel estimation performance while resulting to minimal additional decoding latency of one OFDM symbol and being applicable to most of the current TTI 1010A even at high UE speeds.

The above and other properties of the staggered pilot signal design can assist in the development of OFDM systems offering reliable and robust communication from a Node B to the receiving UEs. Node B may be a base station, access point or the like network entity.

FIG. 11 and FIG. 12 further expand the concept of materially dividing the pilot signal power transmitted by an antenna to two OFDM symbols per TTI for the cases of two transmit FIG. 11 and four transmit antennas FIG. 12.

In FIG. 11, similarly to the one transmit antenna case of FIG. 10, the pilot sub-carriers from the two antennas are placed on the first OFDM symbol 1101 and fifth OFDM symbol 1105. Alternatively, the pilot sub-carriers from the second antenna could be placed on the second OFDM symbol 1102 and sixth OFDM symbol 1106.

In FIG. 12, similarly to that two transmit antennas case of FIG. 11, the pilot sub-carriers from the first two antennas are placed on the first OFDM symbol 1201 and fifth OFDM symbol 1205 while the pilot sub-carriers from the third and fourth antennas are placed on the second OFDM symbol 1202 and sixth OFDM symbol 1206.

Embodiments of the invention can be implemented in either the transmitter or the receiver, or in both, of a multi-carrier system, such as an OFDM system, using software, hardware, or a combination of software and hardware. The software is assumed to be embodied as a lookup table, an algorithm, or other program code that defines the pilot structure in a time transmission interval or frame.

An apparatus for an OFDM based communication system operating in accordance with an OFDM transmission technique would be coupled to a plurality of transmitting antennas and comprise a mapper for converting an input signal to a plurality of data symbols, transmitter circuitry adapted to insert pilot symbols with the data symbols for each transmitting antenna, a modulator for modulating said pilot symbols and data symbols in a transmission time interval in accordance with an OFDM transmission technique. The transmission time interval has multiple OFDM symbols. The power level of the pilot symbols is divided into two OFDM symbols in the transmission time interval. The input signal and plurality of data symbols are comprised of sub-sets, each sub-set intended to a unique receiver in the OFDM based communication system.

Embodiments of the invention may be utilized in a receiver in an OFDM based communication system adapted to perform channel estimation using a received reference signal transmitted from at least one antenna, said reference signal being substantially located into two OFDM symbols. The receiver may also be adapted to use the reference signal located in the first OFDM symbol in succeeding transmission time intervals in addition to the reference symbols in the current and preceding transmission time intervals.

Many modifications and other embodiments of the invention will come to mind to one skilled in the art to which this invention pertains having the benefit of the teachings presented in the foregoing descriptions, the associated drawings, and claims. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A receiver in an orthogonal frequency division multiplexing OFDM based communication system including: a processor adapted to perform channel estimation using a received reference signal transmitted from at least one antenna, said reference signal being substantially located into at least two non-consecutive OFDM symbols of a transmission time interval comprising of more than two OFDM symbols and a power level of said reference signal is divided into said non-consecutive OFDM symbols in said transmission time interval and adapted to use the reference signal located in a first OFDM symbol in succeeding transmission time intervals in addition to the reference symbols in a current transmission time interval and a preceding transmission time intervals.

2. An apparatus for an orthogonal frequency division multiplexing (OFDM) based communication system, said apparatus:

adapted to perform channel estimation using a received reference signal transmitted from a plurality of transmitting antennas, said reference signal being substantially located into two non-consecutive OFDM symbols of a current transmission time interval for each transmit antenna, said transmission time interval comprising of more than two OFDM symbols and a power level of said reference signal is divided into said non-consecutive OFDM symbols in said transmission time interval, wherein a first portion of a plurality of pilot symbols of at least one OFDM symbol is near a beginning of the transmission time interval and a second portion of said plurality of pilot symbols of at least one other OFDM symbol is near a middle of said transmission time interval, wherein a power level of said plurality of pilot symbols has been divided into said two OFDM symbols in said transmission time interval, said apparatus comprising: a receiver adapted to using the first of the two OFDM symbols carrying reference signals in a succeeding transmission time interval in addition to the reference signals in a current transmission time interval and a preceding transmission time interval.

3. The apparatus of claim 2, wherein said input signal and plurality of data symbols are comprised of sub-sets, each sub-set intended for a unique receiver.

4. An apparatus [using] *comprising: a processor using* information for channel estimation in an orthogonal frequency division multiplexing OFDM system, said information in the form of a pilot structure with a transmission time interval of seven OFDM symbols, said pilot structure comprising a plurality of pilot signals from at least *two transmitting antennas, the pilot structure from* one transmitting antenna located in a first OFDM symbol and fifth OFDM symbol of said transmission time interval, [said apparatus comprising: at least two transmit antennas] and wherein said plurality of pilot signals from any antenna are located in said first OFDM symbol and said fifth OFDM symbol or a second OFDM symbol and a sixth OFDM symbol of said transmission time interval.

5. A method for receiving a pilot structure in an orthogonal frequency division multiplexing (OFDM) communication system having a transmitter having a plurality of antennas, said method comprising:

receiving a frame composed with a time domain and a frequency domain, wherein said frame has a transmission time interval in the time domain and occupies a bandwidth in said frequency domain, said transmission time interval comprising of more than two orthogonal frequency division multiplexing symbols, wherein said transmission time interval comprises of seven orthogonal frequency division multiplexing symbols; and receiving a pilot signal, having pilot power level, from [a] *said* plurality of transmitting [antenna] *antennas* into two orthogonal frequency division multiplexing symbols of said frame, wherein a plurality of pilot signals from all transmitting antennas have a plurality of same locations in said time domain and wherein at least one pilot signal from at least [one transmitting antenna] *a first antenna of said plurality of transmitting antennas* has been located in a first OFDM symbol and a fifth OFDM symbol of said transmission time interval and said power level of said pilot signal has been divided into said a first OFDM symbol and a fifth OFDM symbol in said transmission time interval, wherein said transmitter has at least two antennas and a pilot signal from a second antenna *of said plurality of transmitting antennas* has been located in said first and fifth orthogonal frequency division multiplexing symbols of said frame such that said pilot power of said pilot signal from said second antenna is in said first and said fifth orthogonal frequency division multiplexing symbols of said transmission time interval.

6. A method for receiving a pilot structure in an orthogonal frequency division multiplexing (OFDM) communication system having a transmitter having at least two antennas, said method comprising:

receiving a frame composed with a time domain and a frequency domain, wherein said frame has a transmission time interval in the time domain and occupies a bandwidth in said frequency domain, said transmission time interval comprising of more than two orthogonal frequency division multiplexing symbols, wherein said transmission time interval comprises of seven orthogonal frequency division multiplexing symbols; and receiving a pilot signal, having a pilot power level, from a plurality of transmitting antenna into two orthogonal frequency division multiplexing symbols of said frame, wherein a plurality of pilot signals from all transmitting antennas have a plurality of same locations in said time domain and wherein at least one pilot signal from at least one transmitting antenna has been located in a first OFDM symbol and a fifth OFDM symbol of said transmission time interval and said power level of said pilot signal has been divided into said a first OFDM symbol and a fifth OFDM symbol in said transmission time interval, wherein a pilot signal from a second antenna has been located in a second and sixth orthogonal frequency division multiplexing symbols of said frame such that said pilot power of said pilot signal from said second antenna is in said second and said sixth orthogonal frequency division multiplexing symbols of the transmission time interval.

7. A method for receiving a pilot structure in an orthogonal frequency division multiplexing (OFDM) communication system having a transmitter having at least four antennas, said method comprising:

receiving a frame composed with a time domain and a frequency domain, wherein said frame has a transmission time interval in the time domain and occupies a bandwidth in said frequency domain, said transmission time interval comprising of more than two orthogonal frequency division multiplexing symbols, wherein said transmission time interval comprises of seven orthogonal frequency division multiplexing symbols; and receiving a pilot signal, having pilot power level, from a plurality of transmitting antenna into two orthogonal frequency division multiplexing symbols of said frame, wherein a plurality of pilot signals from all transmitting antennas have a plurality of same locations in said time domain, wherein a pilot signal from a third antenna has been located in a second and sixth orthogonal frequency division multiplexing symbols of said frame such that the pilot power of the pilot signal from said third antenna is in a second orthogonal frequency division multiplexing symbol and a sixth orthogonal frequency division multiplexing symbols of the transmission time interval; and further wherein said pilot signal from a fourth antenna has been located in a first orthogonal frequency division multiplexing symbol and a fifth orthogonal frequency division multiplexing symbols of said frame such that the pilot power of the pilot signal from the fourth antenna is in the first and fifth orthogonal frequency division multiplexing symbols of the transmission time interval.

8. A method for receiving a pilot structure in an orthogonal frequency division multiplexing (OFDM) communication system having a transmitter having at least four antennas, said method comprising:

receiving a frame composed with a time domain and a frequency domain, wherein said frame has a transmission time interval in the time domain and occupies a bandwidth in said frequency domain, said transmission time interval comprising of more than two orthogonal frequency division multiplexing symbols, wherein said transmission time interval comprises of seven orthogonal frequency division multiplexing symbols; and receiving a pilot signal, having pilot power level, from a plurality of transmitting antenna into two orthogonal frequency division multiplexing symbols of said frame, wherein a plurality of pilot signals from all transmitting antennas have a plurality of same locations in said time domain, wherein a pilot signal from a third antenna has been located in a first orthogonal frequency division multiplexing symbol and a fifth orthogonal frequency division multiplexing symbol of said frame such that the pilot power of the pilot signal from said third antenna is in said first and fifth orthogonal frequency division multiplexing symbols of the transmission time interval; and a pilot signal from a fourth antenna is located in a second orthogonal frequency division multiplexing symbol and a sixth orthogonal frequency division multiplexing symbols of said frame such that said pilot power of said pilot signal from said fourth antenna is in said second and sixth orthogonal frequency division multiplexing symbols of said transmission time interval.

9. A method for receiving a pilot structure in an orthogonal frequency division multiplexing (OFDM) communication system having a transmitter having at least four antennas, said method comprising:

receiving a frame composed with a time domain and a frequency domain, wherein said frame has a transmission time interval in the time domain and occupies a bandwidth in said frequency domain, said transmission time interval comprising of more than two orthogonal frequency division multiplexing symbols, wherein said transmission time interval comprises of seven orthogonal frequency division multiplexing symbols; and receiving a pilot signal, having pilot power level, from a plurality of transmitting antenna into two orthogonal frequency division multiplexing symbols of said frame, wherein a plurality of pilot signals from all transmitting antennas have a plurality of same locations in said time domain and wherein at least one pilot signal from at least one antenna has been located in a first OFDM symbol and a fifth OFDM symbol of said transmission time interval and said power level of said pilot signal has been divided into a first OFDM symbol and a fifth OFDM symbol in said transmission time interval, wherein a frequency location of a pilot signal from a third antenna is the same as the frequency location of a pilot signal from a first antenna and a frequency location of a pilot signal from a fourth antenna is the same as a frequency location of the pilot from a second antenna.

*10. A method for receiving a pilot structure in an orthogonal frequency division multiplexing (OFDM) communication system having a transmitter having a plurality of antennas, the method comprising:*

*receiving a frame composed with a time domain and a frequency domain, wherein the frame has a transmission time interval in the time domain and occupies a bandwidth in the frequency domain, wherein the transmission time interval comprises seven OFDM symbols; and*

*receiving a reference signal, from said plurality of transmitting antennas wherein the reference signal includes first antenna reference symbols from at least a first antenna of said plurality of transmitting antennas, the first antenna reference symbol located in a first OFDM symbol being at a first frequency, and the first antenna reference symbol located in a fifth OFDM symbol of the transmission time interval being at a second frequency;*

*wherein the reference signal includes second antenna reference symbols from a second antenna of said plurality of transmitting antennas, the second antenna reference symbol located in the first OFDM symbol being at the second frequency, and the second antenna reference symbol located in the fifth OFDM symbol of the transmission time interval being at the first frequency; and*

*using at least one of the received symbols to perform a channel estimate.*

*11. The method of claim 10, wherein the transmission time interval has a 0.5 millisecond duration.*

*12. The method of claim 10, further comprising providing Channel Quality Indication (CQI) feedback.*

*13. The method of claim 10, wherein each symbol of the reference signal at the first frequency also occurs at a third frequency and each symbol of the reference signal at the second frequency also occurs at a fourth frequency.*

*14. The method of claim 13, further comprising providing Channel Quality Indication (CQI) feedback.*

*15. The method of claim 10, wherein the reference signal further includes a third antenna reference symbol from a third antenna, the third antenna reference symbol located in a second OFDM symbol of the transmission time interval and being at the first frequency; and the reference signal further includes a fourth antenna reference symbol from a fourth antenna, the fourth antenna reference symbol located in a second OFDM symbol of the transmission time interval and being at the second frequency.*

*16. The method of claim 15, further comprising providing Channel Quality Indication (CQI) feedback.*

*17. The method of claim 15, wherein each symbol of the reference signal at the first frequency also occurs at a third frequency and each symbol of the reference signal at the second frequency also occurs at a fourth frequency.*

*18. The method of claim 17, further comprising providing Channel Quality Indication (CQI) feedback.*

* * * * *